United States Patent
Cohen et al.

(10) Patent No.: US 9,344,354 B2
(45) Date of Patent: *May 17, 2016

(54) REDIRECTING TELEPHONE CALL TO PACKET-SWITCHED DATA CALL VIA VOICEMAIL

(71) Applicant: Tel-Tech Systems, Inc., South Amboy, NJ (US)

(72) Inventors: Meir Cohen, South Amboy, NJ (US); Eli Finkelman, South Amboy, NJ (US); Bryan Moyles, South Amboy, NJ (US)

(73) Assignee: TEL-TECH SYSTEMS, INC., South Amboy, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/921,091

(22) Filed: Oct. 23, 2015

(65) Prior Publication Data

US 2016/0043939 A1 Feb. 11, 2016

Related U.S. Application Data (63) Continuation of application No. 14/046,034, filed on Oct. 4, 2013, now Pat. No. 9,270,816.

(51) Int. Cl.

| | |
|---|---|
| *H04L 12/66* | (2006.01) |
| *H04L 12/707* | (2013.01) |
| *H04M 3/42* | (2006.01) |
| *H04W 48/18* | (2009.01) |
| *H04M 15/00* | (2006.01) |
| *H04W 48/06* | (2009.01) |
| *H04W 76/02* | (2009.01) |
| *H04W 88/06* | (2009.01) |

(52) U.S. Cl.
CPC ........... *H04L 45/22* (2013.01); *H04M 3/42289* (2013.01); *H04M 15/41* (2013.01); *H04M 15/43* (2013.01); *H04M 15/56* (2013.01); *H04M 15/60* (2013.01); *H04M 15/8083* (2013.01); *H04W 48/18* (2013.01); *H04W 76/023* (2013.01); *H04W 48/06* (2013.01); *H04W 76/028* (2013.01); *H04W 88/06* (2013.01)

(58) Field of Classification Search
CPC .......................... H04M 3/42289; H04L 45/22
See application file for complete search history.

(56) References Cited

U.S. PATENT DOCUMENTS

| | | | | |
|---|---|---|---|---|
| 6,868,080 | B1* | 3/2005 | Umansky | H04L 12/5692 370/354 |
| 6,870,827 | B1* | 3/2005 | Voit | H04L 29/06027 370/352 |
| 2005/0180404 | A1* | 8/2005 | Kwon | H04M 15/08 370/352 |
| 2008/0310399 | A1* | 12/2008 | Narayanan | H04L 12/66 370/352 |
| 2011/0044321 | A1* | 2/2011 | Rosenberg | H04M 7/0057 370/352 |
| 2013/0189968 | A1* | 7/2013 | Ku | H04W 4/16 455/418 |
| 2014/0344806 | A1* | 11/2014 | Suresh | G06F 9/4445 718/1 |
| 2015/0098464 | A1* | 4/2015 | Cohen | H04M 3/42289 370/355 |

* cited by examiner

*Primary Examiner* — Lonnie Sweet
(74) *Attorney, Agent, or Firm* — Michael J. Feigin, Esq.; Feigin & Fridman (57) ABSTRACT

In embodiments of the disclosed technology, devices and methods for redirecting a telephone call from a public-switched telephone to a packet-switched data network. The phone call is initially received via the public-switched telephone network having a dialed number associated with a hand-held wireless device of a called party. Upon initialization of the phone call, a route is determined from the telecommunications switch to the hand-held wireless device of the called party via a packet-switched network. The bandwidth of the packet-switched network is then detected to determine the ability of the network to handle the call. If the packet-switched network is determined to be capable of handling the call, the call is forwarded over the packet-switched data, thereby reducing or eliminating charges for wireless minutes.

18 Claims, 11 Drawing Sheets

REDIRECTING TELEPHONE CALL TO PACKET-SWITCHED DATA CALL VIA VOICEMAIL

FIELD OF THE DISCLOSED TECHNOLOGY

The disclosed technology relates generally to telephone switches and, more specifically, to customized call routing.

BACKGROUND OF THE DISCLOSED TECHNOLOGY

Mobile phone technology has improved drastically to give Internet access to a greater number of users. Many users are afforded unlimited data usage by way of their mobile providers. However, those same users may be restricted as to the number of minutes they are allocated in a given month. In many instances, unlimited data carries a flat monthly rate, while voice calling is tolled on a minute-by-minute basis.

Further, users traveling internationally may incur significant roaming charges for voice calling. However, these users may have access via Wi-Fi to the Internet. Presently, online services exist through which a user may communicate using voice calling. However, none of these services allow a user to use his or her original number. Moreover, none of these services allow a regular incoming call to be transferred from the public-switched telephone network over to a packet-switch data network, and vice versa.

SUMMARY OF THE DISCLOSED TECHNOLOGY

In one embodiment of the disclosed technology, a telecommunications switch is disclosed. Such a telecommunications switch or switch is defined as a device which, at least, receives and routes telephone calls. The telecommunications switch, in embodiments, has a connection, such as direct or wireless-based electrical connection to a packet-switched network and a connection to the public switched telephone network. The public switch telephone network (herein "PSTN") is a publicly accessible circuit-switched telephone network which allows telephones in the world to communicate with other telephones. A phone call is received via the PSTN at a hand-held wireless device of a called party. A processor or other non-transitory medium (herein, used interchangeably) is instructed to determine a route from the telecommunications switch to the hand-held wireless device of the called party via the packet-switched network. When the route is found, the bandwidth of said packet-switched network is determined. A processor is instructed to select to send the call to the hand-held wireless device associated with the called party via one of the networks. The call is sent via the packet-switched network when the determined bandwidth is sufficient to handle the phone call. The call is sent via the public-switched telephone network when the determined bandwidth is insufficient to handle the phone call.

The dialed number may be determined based on a diversion header associated with the phone call. A diversion header carries information about the redirection of a call. The phone call may be initially received by the hand-held wireless device associated with the called party and forwarded to the telecommunications switch, such as through existing protocols known, including call forwarding and/or forwarding to voicemail, with the voicemail number being associated with the communications switch. In further embodiments, the processor carries out instructions to forward the phone call to a non-inward WATS (wide area telephone service) telephone number before the step of sending. Then, ANI (automated number identification) information associated with said phone call is determined and provided to the hand-held wireless device.

In further embodiments, the phone call is sent via the packet-switched network and the phone call is rerouted to the PSTN upon a pre-determined threshold number of packets being dropped. After the telecommunications switch reroutes the call to the PSTN, the telecommunications switch performs another re-routing back to the packet-switched network upon detection of a pre-determined DTMF key sequence being entered. The phone ringing may be suppressed and/or the software on the phone may instruct a processor to automatically answer the PSTN call and disconnect the VOIP connection. Similarly, this may happen in reverse when transferring a call from PSTN to VOIP. The In another embodiment, during a call on the PSTN, the telecommunications switch may reroute the call via the packet-switched network. The processor of the telecommunications switch determines that the instruction to transfer the phone call to the packet-switched network originated from the hand-held wireless device where the call is currently terminating.

In a still further embodiment, the step of determining bandwidth is based on a data network type reported via the packet-switched network from the hand-held wireless device. Further, the step of sending the call to the public-switched telephone network is carried out in all cases when the data network type is known to be unable to support the call on the packet switch network.

In still a further embodiment, a bill mechanism may be instructed to levy a fee on an account associated with the called party. The billing mechanism may be any way of tolling a wireless subscriber for usage. The fee is determined based on units of time during which the phone call is carried on the PSTN. "Units of time," for purposes of this specification, are defined as any measurable interval of time during which a call is carried on a particular route or over a particular network. For example, the fee may be levied in 6-second intervals, whereby a one minute-duration of a call carried over the PSTN would be measured and billed as 10 units of time. The fee per unit time is higher when the phone call is carried on the PSTN. The called party may be charged for part of the duration of the phone call—the part of the duration corresponding to an amount of time said call was active over the PSTN.

In another embodiment of the disclosed technology, a method is provided for switching telecommunications networks. The method proceeds, not necessarily in any particular order, by: a) receiving a phone call via the public-switched telephone network, the phone call having a dialed number associated with a hand-held wireless device of a called party; b) determining if, in addition to a network path via the public-switched telephone network, the hand-held wireless device of said called party has an active and authenticated data connection via a packet-switched network with a telecommunications switch; c) determining that sufficient bandwidth exists over the packet-switched network for the phone call; d) sending the phone call to the hand-held wireless device associated with the called party via the authenticated data connection; and/or e) where an insufficient bandwidth condition arises over the packet-switched network, connecting the phone call via the public-switched telephone network.

In further embodiments of the disclosed method, the call is first sent to the handheld wireless device via the PSTN; then after receiving a command from the wireless device to reconnect the call, the call is sent via the packet-switch network.

Still further, the call may be received at the telecommunications switch after having been initially received via the public-switched telephone network. In another embodiment, the phone call is received at the telecommunications switch after being initially received from the wireless device and automatically forwarded to the telecommunications switch. The call may also be sent to the hand-held wireless device via the packet-switched network.

In still a further embodiment of the disclosed method, an additional step may be provided of receiving an indication from the hand-held wireless device to reconnect the call via the public-switch telephone network. The call may be transferable to the packet-switch network by a prompt on the hand-held wireless device. The call may be initially forwarded to the telecommunications switch over the PSTN or the packet switched data network.

In further embodiments of the disclosed method, a fee may be charged for even only a portion of minutes of the phone call. The portion may consist of, for example, minutes during which the phone call continues over the public-switched telephone network. Additional steps may be provided of: a) determining network conditions of the packet switched network before the step of attempting to send the phone call via the packet switched network; b) at a first connecting of the call to the called party, connecting the call via the public switched telephone network based on insufficient network conditions for the call; and/or c) transferring the phone call, to the packet switched network upon detection of a pre-determined dual-tone multi-frequency ("DTMF") key sequence being entered. Alternatively, the call may be sent via the packet switch network, and during the call, the call may be transferred to the public switched telephone network upon a pre-determined threshold number of packets being dropped. Still further, the phone call may be forwarded to a non-inward WATS telephone number before the step of sending, and ANI information may be sent to the hand-held wireless device in the form of caller identification information.

DETAILED DESCRIPTION OF EMBODIMENTS OF THE DISCLOSED TECHNOLOGY

The disclosed technology described herein provides devices and methods for redirecting a telephone call from a public-switched telephone to a packet-switched data network. The phone call initially being received via the public-switched telephone network having a dialed number associated with a hand-held wireless device of a called party. Upon initialization of the phone call, a route is determined from the telecommunications switch to the hand-held wireless device of the called party via a packet-switched network. The bandwidth of the packet switched network is then detected to determine the ability of the network to handle the call. If the packet-switched network is determined to be capable of handling the call, the call is forwarded over the packet-switched data, thereby reducing or eliminating charges for wireless minutes. If the bandwidth of the data-switched network is insufficient to handle the current call, the call is moved to the public-switched network for continuation.

Embodiments of the disclosed technology are described below, with reference to the figures provided.

Figure 1:
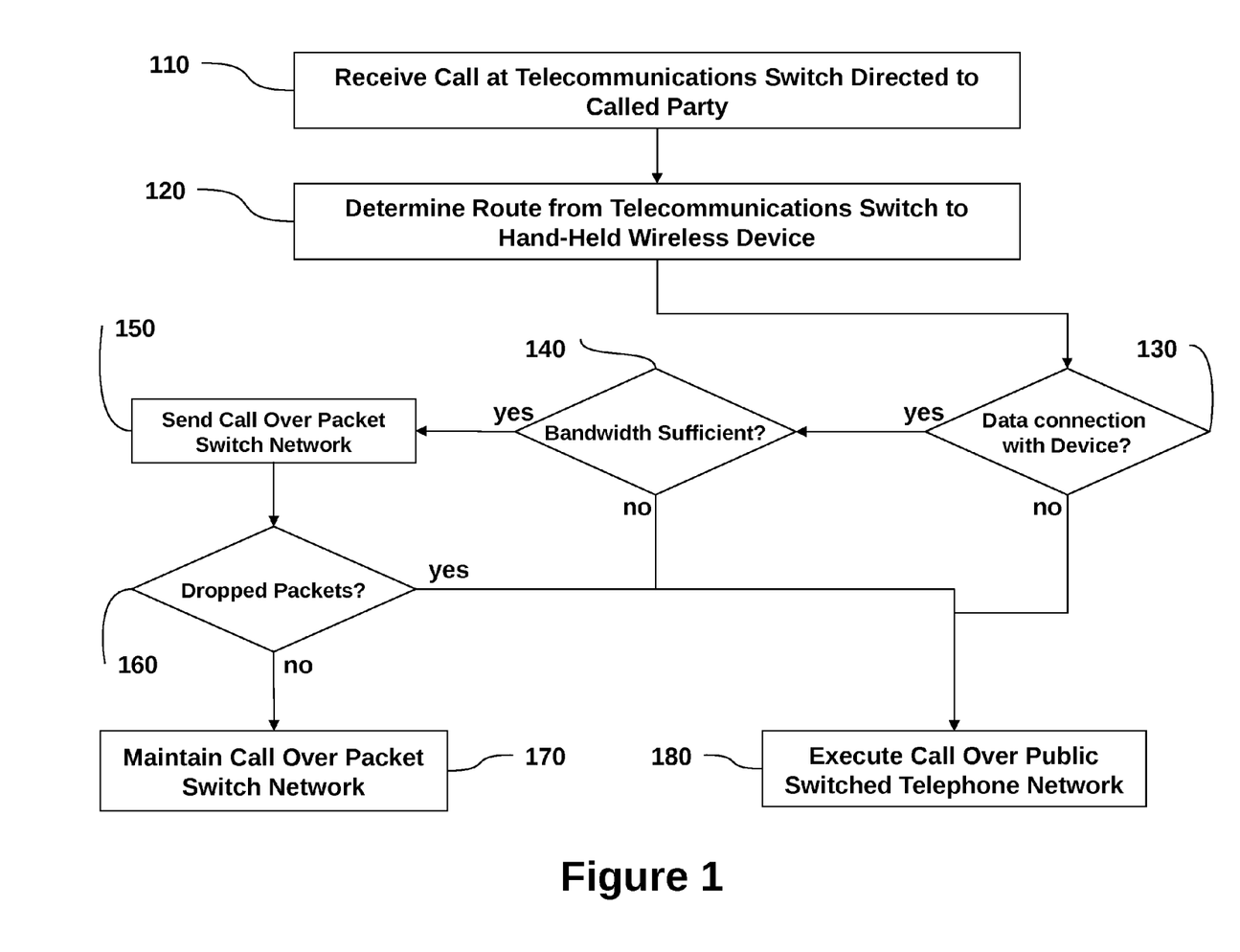
FIG. 1 shows a diagram of steps taken when a call is received by a called party of embodiments of the disclosed technology.

FIG. 1 shows a diagram of steps taken when a call is received by a called party of embodiments of the disclosed technology—the method being in step 110 when a telephone call is received at a telecommunications switch, and the call being directed to a called party. The call is received from a calling party. A "calling party" defined as a person or device that initiates a phone call over a telephone network, such as, for example, a ordinary telephone service network, voice over internet protocol network, combination thereof, or other. A switch is defined as a device which, at least, receives and routes telephone calls. A switch may also create and disconnect electrical connections between two devices on a phone network, may record a phone call, may receive/send and interpret DTMF tones or voice prompts, and so forth. Further, when used in this disclosure, a "switch" may include one or more separate devices which are electrically connected, or with exchange data with each other over a network to carry out steps disclosed in the claims of this patent application. The telecommunications switch may be operated by a third party and may be separate and distinct from the wireless providers of the calling party and/or the called party.

Such a switch, as defined above, receives an incoming call in step 310. This call is designated for a target-called party, such as based on a phone number of the called party (a SIP ID or other equivalents should be understood as being within the concept of "called party," where a SIP ID is a session interface protocol.) Next, in step 120, a route is determined by which the call will be delivered to the hand-held wireless device (herein "wireless device" or "mobile device") of the called party. This step may be carried out before or after the phone call has been initially delivered to the wireless device.

In step 130, it is determined whether the wireless device is connected to a packet-switch data network. Packet-switch data network, for purposes of this specification, is defined as any network through which data packets may be sent wirelessly and received via the internet. Such networks may be, for example, 3G, 3.5G, 4G, HSPA, HSPA+, Edge, LTE, etc.

Furthermore, a mobile device connected via wireless local area network (e.g., Wi-Fi) to the internet may also be considered to be connected to a wireless network. Such networks are distinguishable from a core-switched network and/or the public-switched telephone network, both of which are limited to transmitting voice calls and text. If a data connection is detected, the method proceeds to step 140. If no data connection is detected, in step 180, the call is executed over the public-switched telephone network. The public switch telephone network (herein "PSTN") is the publicly accessible circuit-switched telephone network which allows any telephone in the world to communicate with any other telephone.

In embodiments, the call may be received via the public-switched telephone network, in which case step 180 would involve the call continuing on the public-switched telephone network. Detection of packet switch data network connectivity may be carried out, at least in part, by a software application on the mobile device. If data connectivity is detected, in step 140 is determined whether sufficient bandwidth is available for handling a voice call over the packet-switch data network. Thus, for example, if the wireless device is connected to an Enhanced Data Rates for GSM Evolution ("EDGE") network, the bandwidth may be approximately 400 kilobytes per second. Such speeds may be insufficient for handling a voice call via packet data. As such, the call may be directed to be executed over the public-switch telephone network in step 180. If the wireless device is connected to a 4G network or a local area network via Wi-Fi, for example, the bandwidth may be sufficient. In carrying out this step, a threshold minimum bandwidth may be calibrated that, if met, the method proceeds to step 150.

In step 150, with certain prerequisites having been met, the call is sent over the packet-switch network. As far as the calling party is concerned, the call may carried out in similar manner to any PSTN voice call, and the calling party may not even be made aware that the call is being executed via a packet-switch data network. The called party may or may not be put on notice that the call is being executed over a packet-switch network. Such knowledge however, may be invaluable to the called party upon taking the call because the called party may choose to remain on the phone call for a longer duration if he or she knows they aren't being charged for minutes.

While the call is being carried out, packet loss may be monitored. Packet loss occurs when one or more packets of data traveling across a computer network fail to reach their destination or are "dropped." For a wireless device, packet loss may occur, for example, when a user is moving out of the range of a packet-switch data network Thus, in step 160, if a threshold number of packets is dropped during the course of the call, the call may be transferred back to the PSTN. The dropped packets may be measured as a function of time or in total. Such a measure prevents a possible drop call or poor call quality. If few or no dropped packets are detected, the call is maintained on the packet switch network in step 170.

Furthermore, when a call is rerouted to the public-switched network, it may be re-routed back to the packet-switched network upon detection of a pre-determined dual-toned multi-frequency key being entered. Dual-toned multi-frequency (herein "DTMF") signaling is the telecommunication signaling system carried out over analog telephone lines on the public-switch telephone network. When a desired number is to be called, such signals are sent in an array and interpreted for determination of the number dialed to be called.

Figure 2:
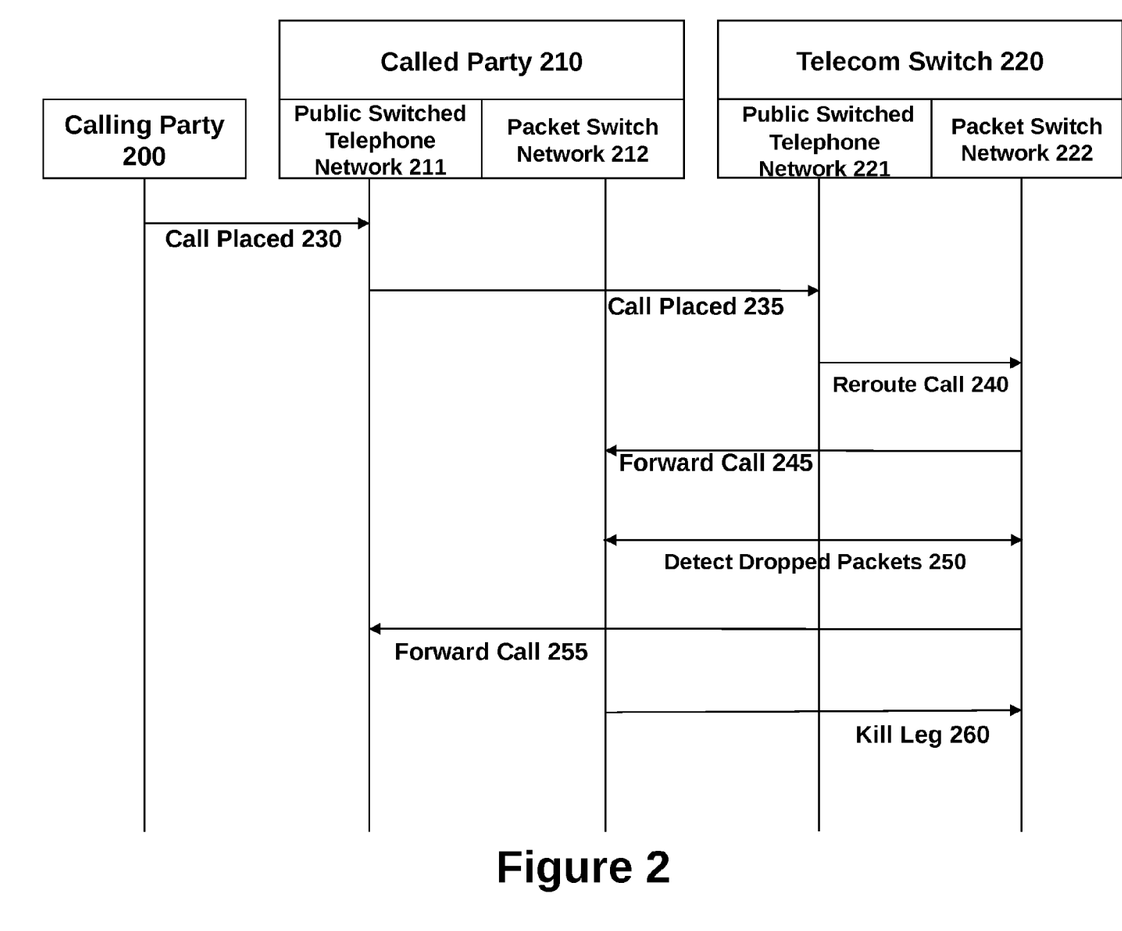
FIG. 2 shows a diagram of a method of routing a call over multiple switches in embodiments of the disclosed technology.

FIG. 2 shows a diagram of a method of routing a call over multiple switches in embodiments of the disclosed technology. A calling party 200, defined as a person or device that initiates a phone call over a telephone network (a plain old telephone service (POTS) network, voice over internet protocol network (VOIP), combination thereof, or other) places a call 230 directed to a called party 210. This call is executed via a public switch 211, which may be operated by the telecom provider of the calling party and/or may comprise a plurality of switches between the calling party 200 and called party 210. The call is then placed 235, via a further leg or further legs (communications channels between two switches or a switch and a party to the phone call) over the public switched telephone network 211, 221 to a telecommunications switch 220. The telecommunications switch 220 ("telecom switch") may be operated by a telecom provider or a third-party having no association with either telecom provider of the calling party 200 and/or the called party 210.

At the telecom switch 220, the call may be moved 240 from the PSTN 221 to a packet-switch network 222. The called party 210 is the desired target of the calling party 200 (or may be a new target designated by the called party 210, such as by way of call forwarding or the like). Thus, the call is then forwarded in step 245 via the packet switched network 222, from the called party 210. Before forwarding the call and during the call, the number of dropped packets is detected 250 over the packet switched network 222, 212 between the telecom switch 220 and the called party 210. Upon detection of dropped packets, either before forwarding the call or during the call, the call may be forwarded 255 back to the called party 210 on the public switched telephone network 211. In this instance, the leg of the call on the packet switch network, if existing, is killed 260.

Figure 3:
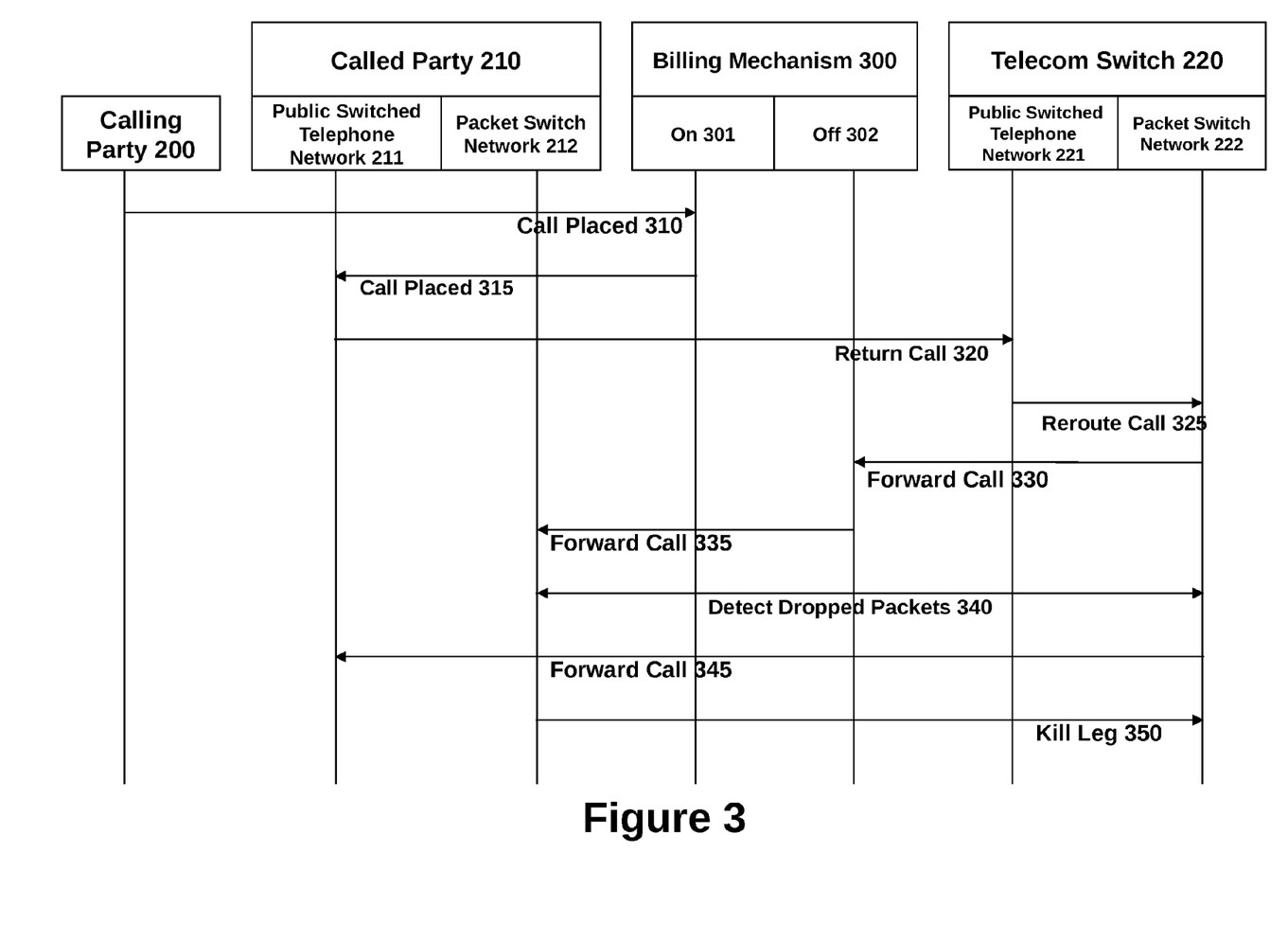
FIG. 3 shows a diagram of a method of routing a call similar to that of FIG. 2, while incorporating a fee in embodiments of the disclosed technology.

FIG. 3 shows a diagram of a method of routing a call similar to that of FIG. 2, while incorporating a fee in embodiments of the disclosed technology. In this embodiment, upon placing a call 310 to a called party 210, a billing mechanism 300 is initiated 301 to apply billing charges. Such charges may be facilitated by a wireless provider, and may be measured, for example, in minutes. The call is placed 315 to the called party 210 over the PSTM 211 with charges accruing. The wireless device of the called party 210, if employing the disclosed technology, returns the call 320 to the telecommunications switch 220 via PSTN 211, 221 communication.

At the telecom switch 220, the call is moved 325 to the packet switch network 222. As the call is forwarded 330, the billing mechanism 300 is turned off 302 due to the call being transmitted via packet data. The call is then forwarded 335 to the called party 210 via the packet-switch network 212. Again, the monitoring of dropped packets 340 begins before the forwarding and during the handling of the call over the packet switch network 212. Upon detection of packet loss, a leg may be initiated forwarding the call 345 to the called party 210 via the PSTN 211. If the call is forwarded in step 345 via the PSTN 211, then the packet-switched leg 212, 222 is killed in step 350.

The billing mechanism 300 is instructed to levy (charge) a fee to an account associated with the called party 200. The billing mechanism 300 may be any way of tolling a wireless subscriber for usage. The fee is determined based on units of time during which the phone call is carried on the PSTN. "Units of time," for purposes of this specification, are defined as any measurable interval of time during which a call is carried on a particular route or over a particular network. For example, the fee may be levied in 6-second intervals whereby a one minute duration of a call carried over the PSTN would be measured and billed as 10 units of time. The fee per unit time may be higher when the phone call is carried over the PSTN. Alternatively, the fee may only be charged when the call is carried over the PSTN. As such, when the call is switched to the PSTN 211, the billing mechanism 300 is toggled to be on 301, thus recording units of time for purposes of billing. The called party may be charged for part of the duration of the phone call, the part of the duration corresponding to an amount of time said call was active over the PSTN.

Figure 4:
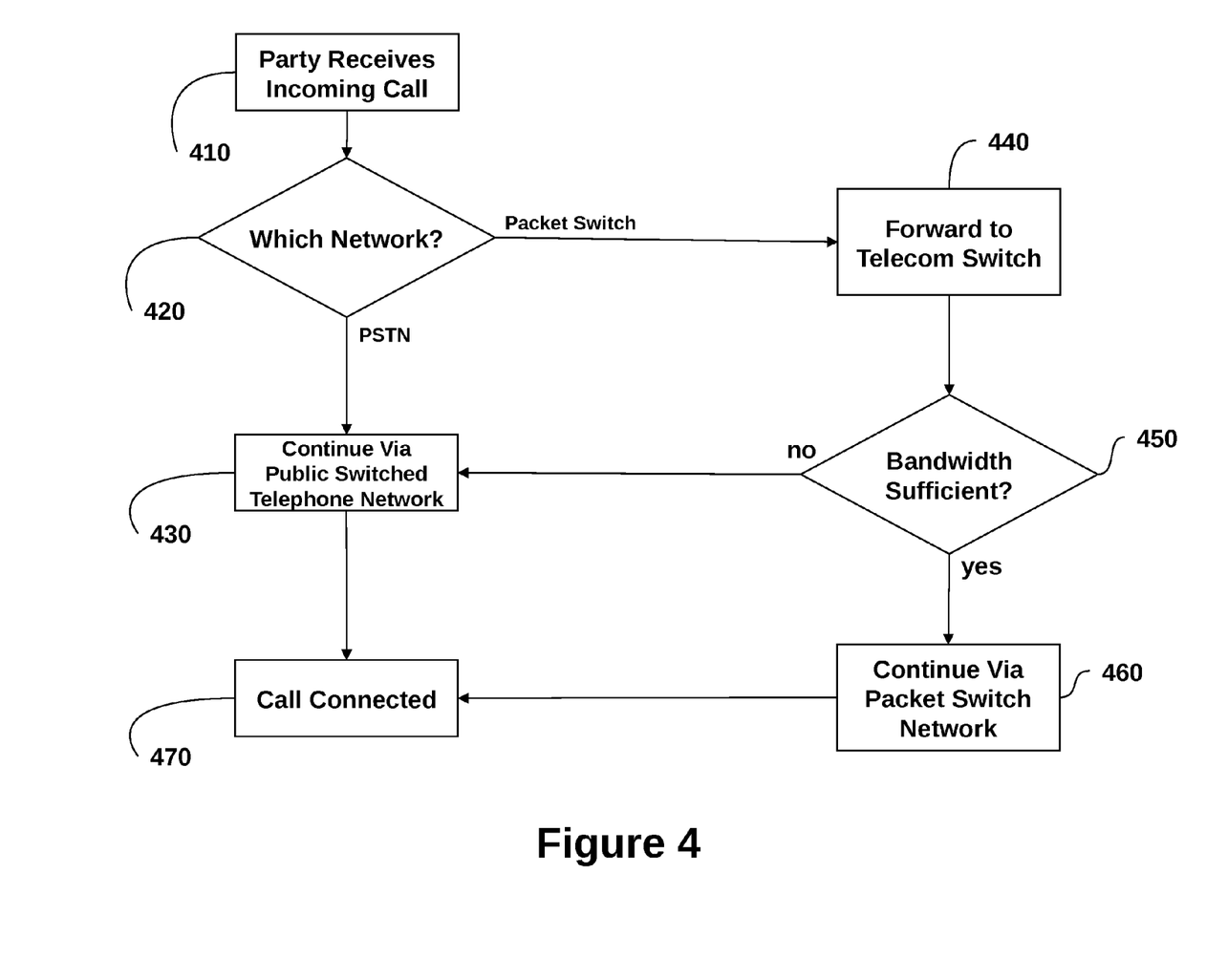
FIG. 4 shows a diagram of steps taken from the perspective of a called party of embodiments of the disclosed technology.

FIG. 4 shows a diagram of steps taken from the perspective of a called party of embodiments of the disclosed technology. In this embodiment, the called party may have an interface configured via an associated wireless device by which the called party may be able to designate how an incoming call is routed. For example, the called party may configure the wireless device to automatically take certain steps when an incoming call is received. Alternatively, the wireless device may be configured to prompt the called party, each time a call is received, to decide how the call should be routed.

The method begins with step, 410 whereby a called party receives an incoming call. In step 420, the network employed to carry the call is determined. Again, this may be carried out automatically based on user pre-configuration, or on a manual basis by prompting the called party. If the PSTN is chosen, then the call continues on the PSTN pursuant to step 430. In step 470, the call is connected. If the packet-switch network is elected to carry out the call, the call is forwarded to the telecom switch 440. Then, in step 450 the bandwidth of the packet data connection is assessed to determine if the call can be handled via packet data. If the bandwidth is insufficient, the call may be routed back to the public switched telephone network in step 430. As such, the call would be connected in step 470 via the PSTN. If the bandwidth is determined to be sufficient to handle the call, then, in step 460, the call is sent via the packet-switch data network. Then, the call is connected in step 470 via the packet-switch data network.

Figure 5:
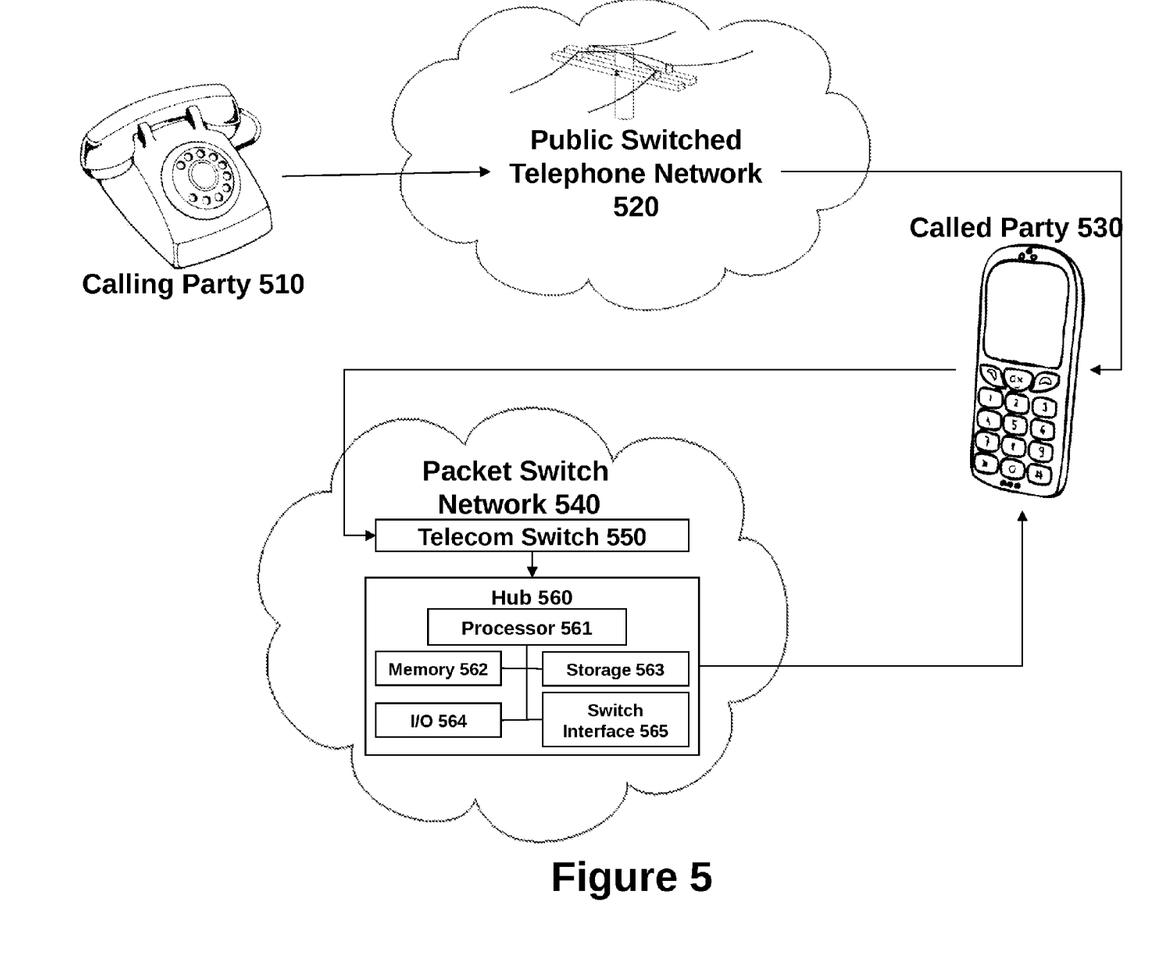
FIG. 5 shows a high level drawing of an exemplary system arrangement according to an embodiment of the disclosed technology.

FIG. 5 shows a high level drawing of an exemplary system arrangement according to an embodiment of the disclosed technology. A calling party 510 initiates a phone call over a telephone network, such as, for example, a plain old telephone service network, voice over internet protocol network, combination thereof, or other. The call accesses the public-switched telephone network 520 to be forwarded to a wireless device of a called party 530. When the call is received, the wireless device of the called party 530 accesses a telecom switch 550 via a packet-switch network 540 for purposes of transferring the call thereto. Access to the packet switch network 540 may be carried out using a pre-existing data connection provided by a telecommunications provider associated with the wireless device.

Access to the telecom switch 550 may be carried out via the packet switch network 540 using an interface on the wireless device. The interface may be, for example, a software application installed onto the wireless device. The software application may be configured by a user. The wireless device may communicate data to and from the telecom switch 550. The data may include account information, billing information, automatic number identification ("ANI"), and other information relevant to the call, the calling party, and the called party. The telecom switch 500 is a central repository for all accounts associated with called parties. The telecom switch 550 executes the transfer and forwarding of calls using a hub 560. In an embodiment thereof, a hub 560 comprises a processor 561, memory 562, input/output 563, storage 564, and a network interface 565. These features correspond to those described in further detail below with regard to FIG. 6 and the description thereof, below.

From the telecom switch 550, the call is transferred back to the called party 530 to be preferably handled over the packet-switch network 540 subject to the bandwidth and connectivity considerations previously discussed. All of the steps and processes illustrated may be carried out simultaneously or over a short period of time.

Figure 6:
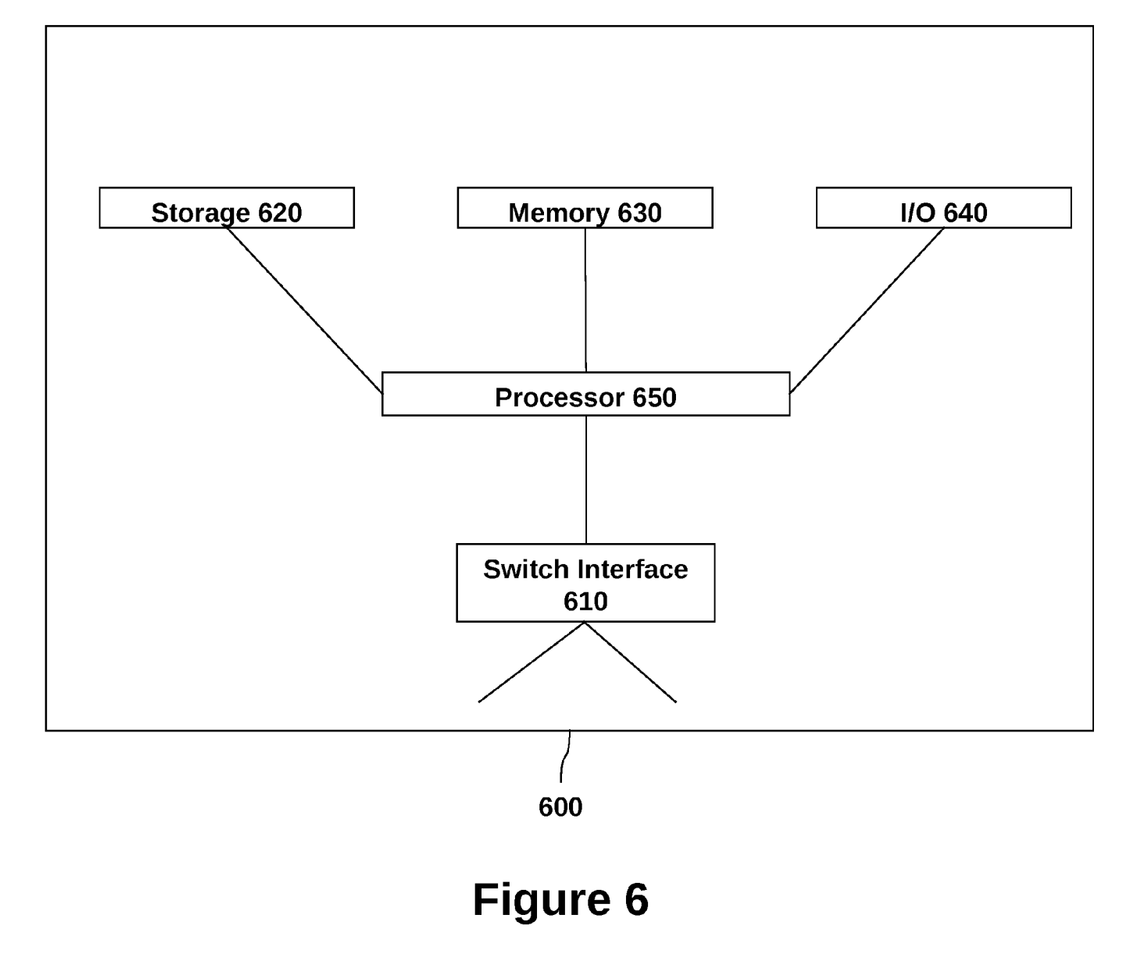
FIG. 6 shows a high-level block diagram of a device that may be used to carry out the disclosed technology.

FIG. 6 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/or storage 620, and the console will be controlled by processor 650 executing the console's program instructions. A device 600 also includes one or a plurality of input network interfaces for communicating with other devices via a network (e.g., the internet). The device 600 further includes an electrical input interface. A device 600 also includes one or more output network interfaces 610 for communicating with other devices. Device 600 also includes input/output 640 representing devices which allow for user interaction with a computer (e.g., display, keyboard, mouse, speakers, buttons, etc.). One skilled in the art will recognize that an implementation of an actual device will contain other components as well, and that FIG. 6 is a high level representation of some of the components of such a device for illustrative purposes. It should also be understood by one skilled in the art that the method and devices depicted in FIGS. 1 through 5 may be implemented on a device such as is shown in FIG. 6.

Further, it should be understood that all subject matter disclosed herein is directed and should be read only on statutory, non-abstract subject matter. All terminology should be read to include only the portions of the definitions which may be claimed. By way of example, "computer readable storage medium" is understood to be defined as only non-transitory storage mediums.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

Figure 7:
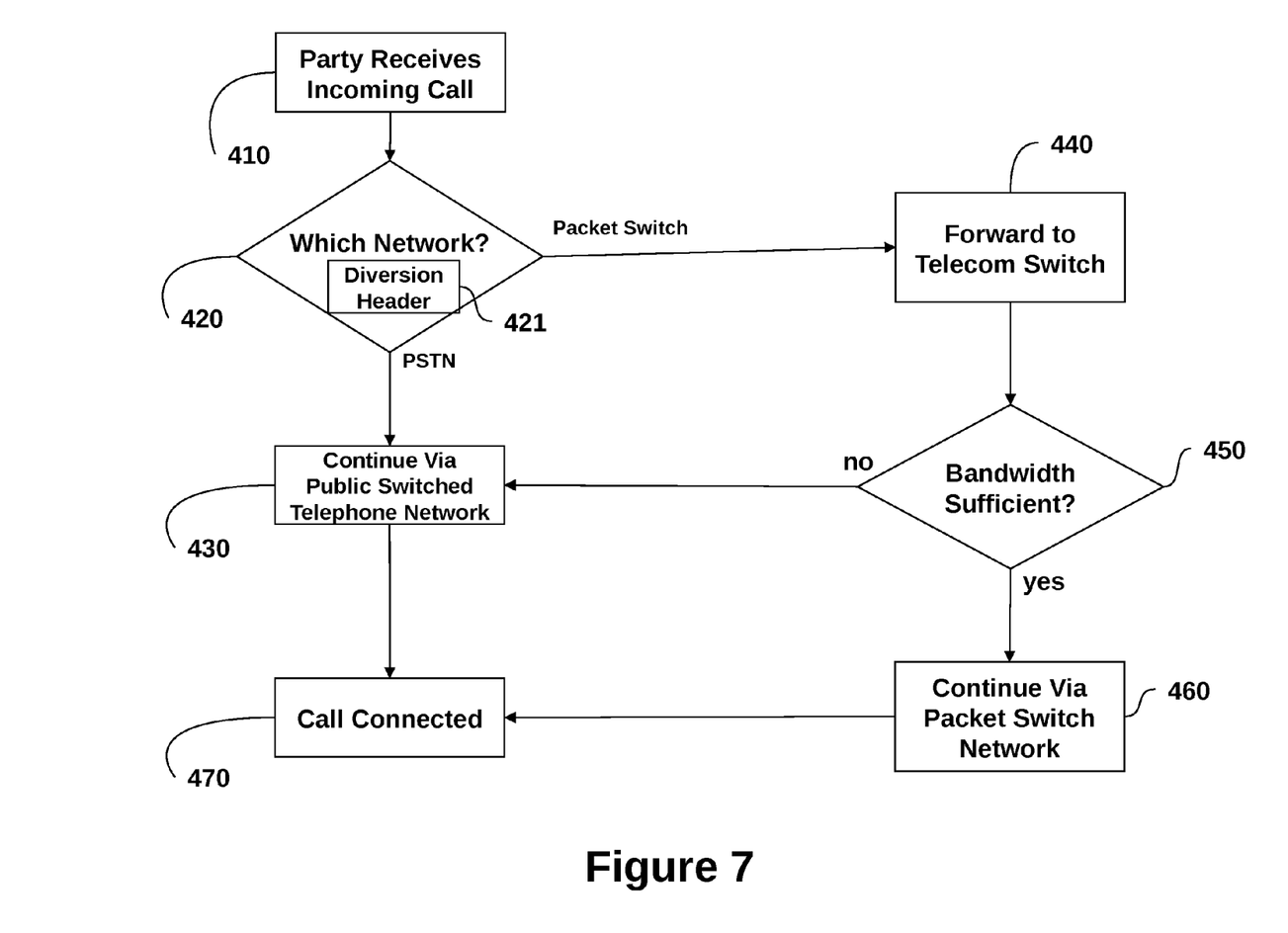
FIG. 7 shows a diversion header with the steps taken from the perspective of a called party of embodiments of the disclosed technology.

FIG. 7 shows a diversion header with the steps taken from the perspective of a called party of embodiments of the disclosed technology. Here, the elements of FIG. 4 remain identical to that of FIG. 7 except that a diversion header 421 is shown in the "Which Network?" block 420. A dialed number may be determined based on the diversion header 421 associated with the phone call.

Figure 8:
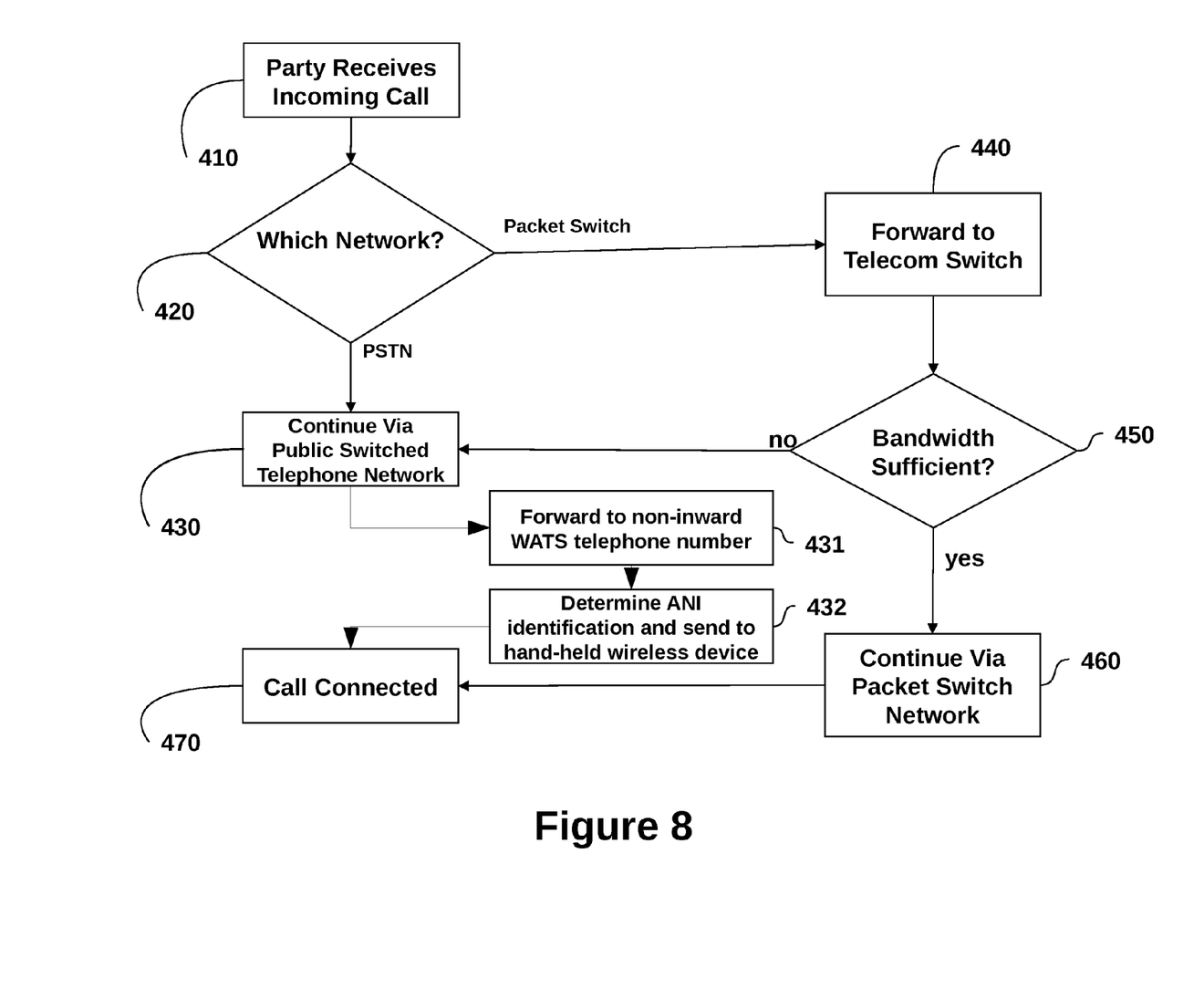
FIG. 8 shows steps of forwarding to an non-inward WATS telephone number with the steps taken from the perspective of a called party of embodiments of the disclosed technology.

FIG. 8 shows steps of forwarding to an non-inward WATS telephone number with the steps taken from the perspective of a called party of embodiments of the disclosed technology. Here, the elements of FIG. 4 remain identical to that of FIG. 7 except that in step 431 the call over a PSTN is forwarded to a non-inward WATS telephone number. Then, in step 432, ANI indemnification is determined and this data is sent to a hand-held wireless device.

Figure 9:
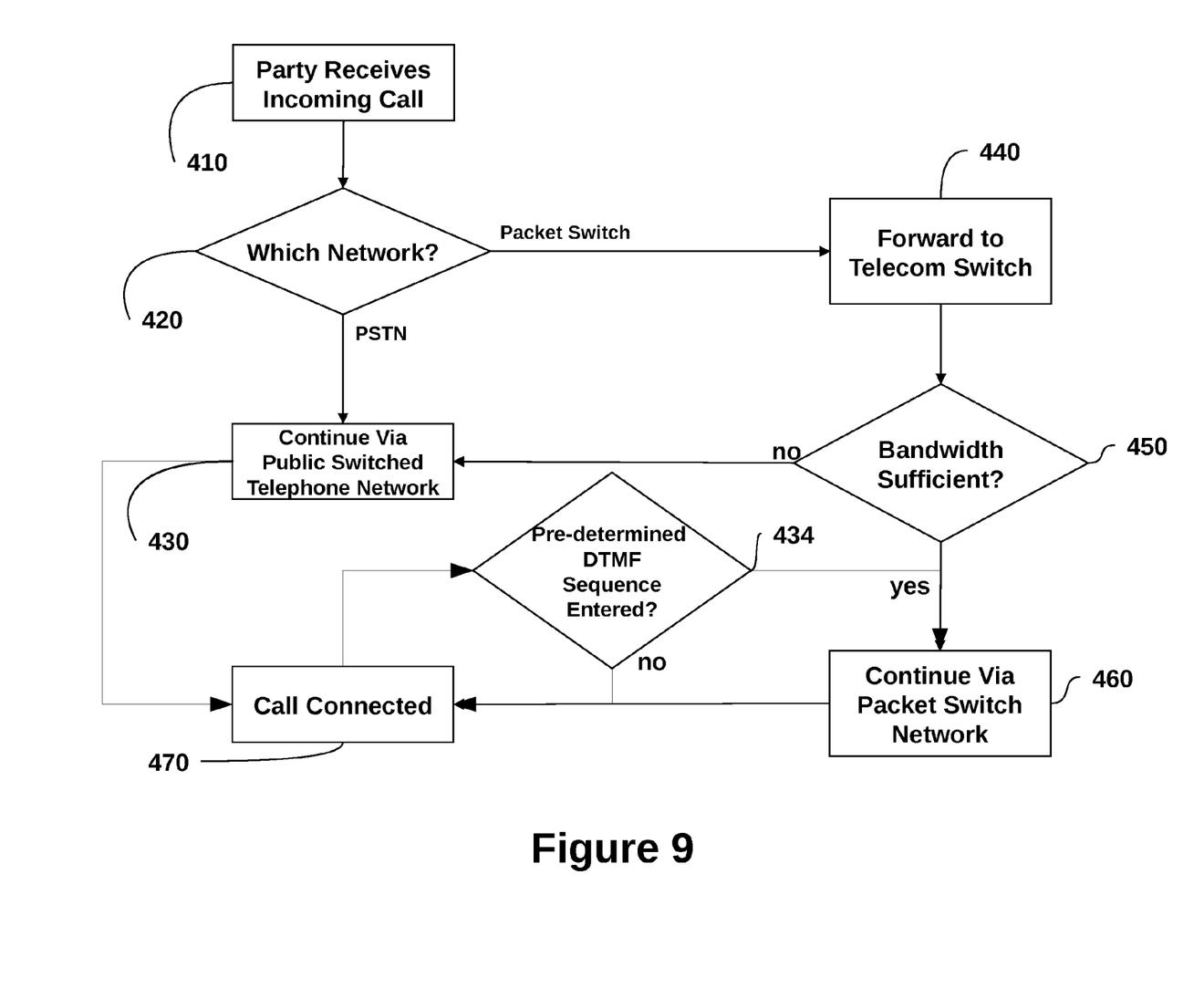
FIG. 9 shows a DTMF sequence to move a call from a PSTN to packet-switched network from the perspective of a called party of embodiments of the disclosed technology.

FIG. 9 shows a DTMF sequence to move a call from a PSTN to packet-switched network from the perspective of a called party of embodiments of the disclosed technology. Here, the elements of FIG. 4 remain identical to that of FIG.

7 except as follows. Once a call is connected in step 470, it is determined in step 434 whether a pre-determined DTMF sequence has been entered. If not, the call remains connected as it was over the PSTN. If so, then the call is moved to a packet switched network.

Figure 10:
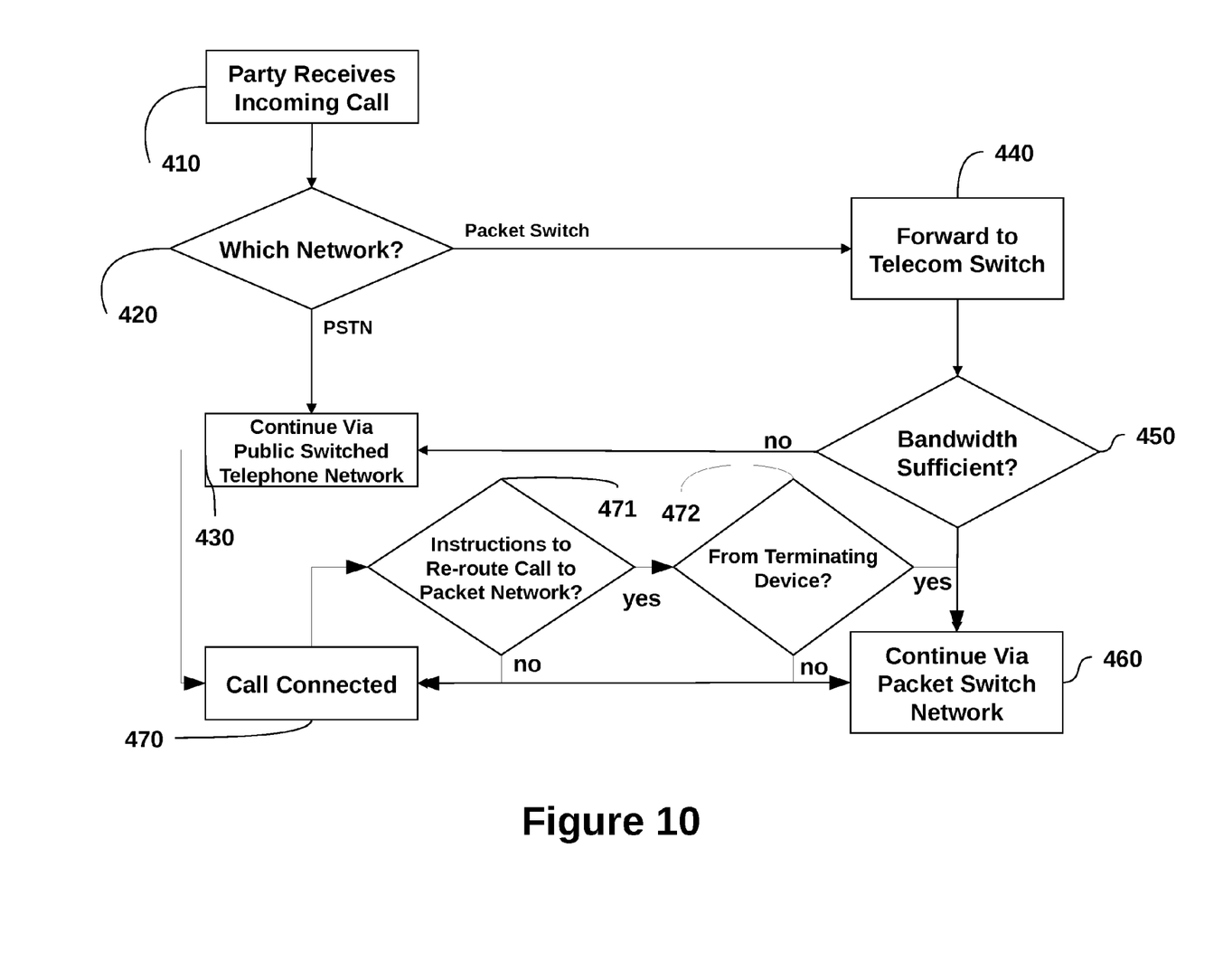
FIG. 10 shows checking if instructions to re-route a call over a packet switched network are received from the terminating handheld wireless device from the perspective of a called party of embodiments of the disclosed technology.

FIG. 10 shows checking if instructions to re-route a call over a packet switched network are received from the terminating handheld wireless device from the perspective of a called party of embodiments of the disclosed technology. Here, the elements of FIG. 4 remain identical to that of FIG. 7 except as follows. Once the call is connected in step 470, then the telecommunications switch receives instructions to reroute the call via the packet-switched network as represented by box 471. When such instructions aren't received, the call remains connected. When they are received, it must be checked, in step 472, if the instructions originate from the hand-held wireless device where the call is currently terminating. If so, then the call continues over the packet switched network in step 460. If not, then the call remains as currently connected.

Figure 11:
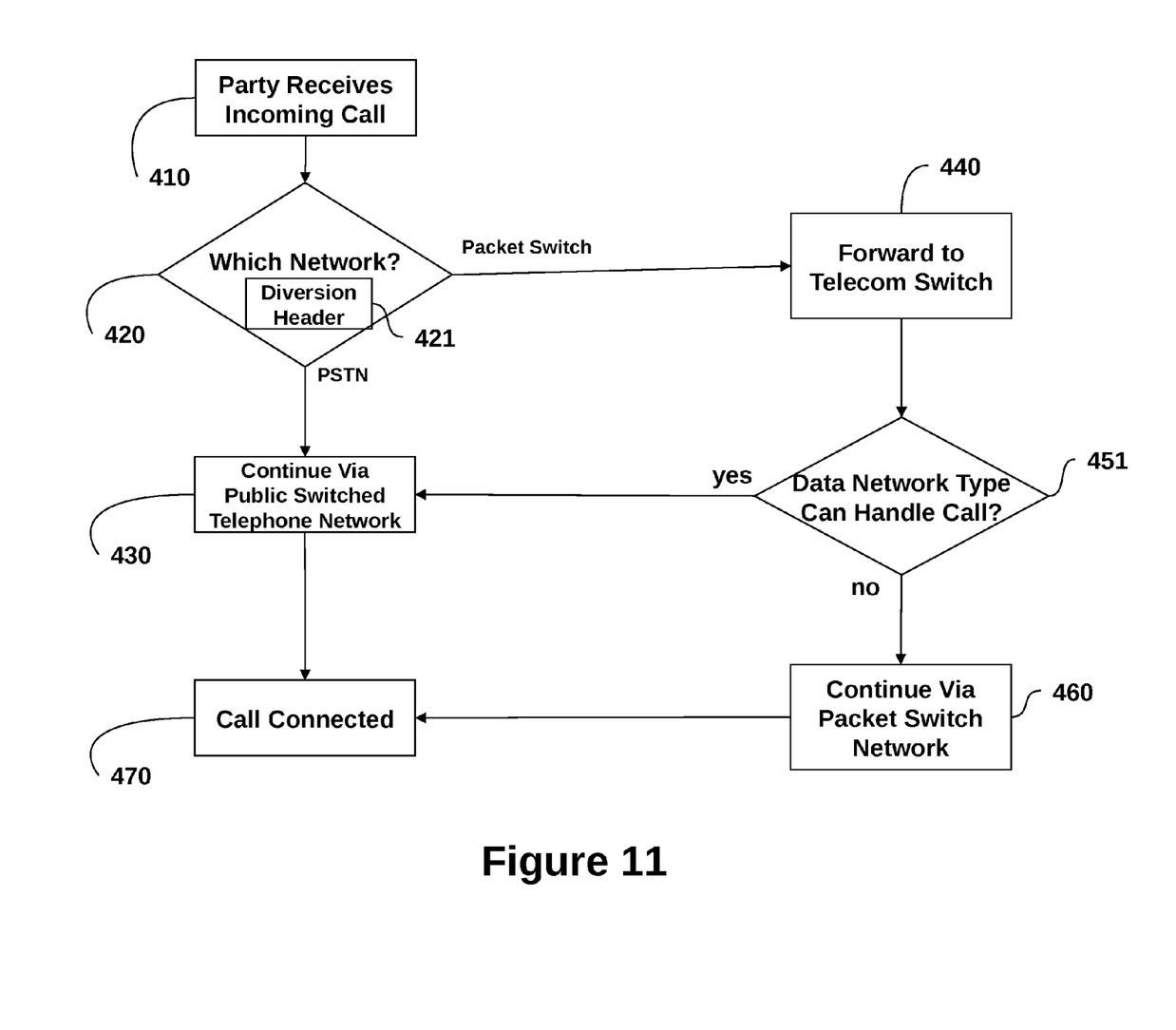
FIG. 11 shows an embodiment of FIG. 4 where the data network type, instead of bandwidth determination is used to determine which network to send the call from the perspective of a called party of embodiments of the disclosed technology.

FIG. 11 shows an embodiment of FIG. 4 where the data network type, instead of bandwidth determination is used to determine which network to send the call from the perspective of a called party of embodiments of the disclosed technology. Here, the elements of FIG. 4 remain identical to that of FIG. 7 except as follows. Box 450 is replaced with box 451 where it is determined whether the data network type is known to be unable to support the call to the packet-switched network. In such a case where it cannot handle the call, the call is always continued on the PSTN in step 430. Where it can handle the call, the call continues on the packet switched network 460.

We claim:

1. A telecommunications switch, with:
   a data connection to a packet-switched network;
   an electrical connection to a public-switched telephone network via which a phone call is received, said phone call having a dialed number associated with a hand-held wireless device of a called party;
   a processor executing instructions to determine a route from said telecommunications switch to said hand-held wireless device of said called party via said packet-switched network and where said route is found, to determine bandwidth of said packet-switched network and make a further determination as to the suitability of using said packet-switched network based on a said bandwidth determined and a network type;
   said processor or a different processor executing instructions to send said call to said hand-held wireless device associated with said called party via one of:
   said packet-switched network when said determined bandwidth is sufficient to handle said phone call; or
   said public-switched telephone network when said determined bandwidth is insufficient to handle said phone call;
   wherein said determining bandwidth is based on a data network type reported via said packet-switched network from said hand-held wireless device wherein said data network has a known maximum bandwidth reported by said hand-held wireless device.

2. The telecommunications switch of claim 1, wherein said dialed number is determined based on a diversion header associated with said phone call.

3. The telecommunications switch of claim 1, wherein said phone call was initially received at said hand-held wireless device associated with said called party and forwarded to said telecommunications switch and communication between said hand-held wireless device and said telecommunications switch is closed.

4. The telecommunications switch of claim 1, wherein said phone call is sent via said packet-switched network; and
   said telecommunications switch reroutes said call to said public-switched telephone network upon a pre-determined threshold number of dropped packets.

5. The telecommunications switch of claim 1, further comprising a billing mechanism which, when enabled charges a wireless subscriber for usage time to an account associated with said called party, said fee determined based on units of time said phone call is carried on said packet-switched network and units of time said phone call is carried on said public-switched telephone network, wherein said fee per unit time is higher when said phone call is carried on said public-switched telephone network.

6. The telecommunications switch of claim 1, wherein said called party is charged for part of the duration of said phone call, said part of said duration of said phone call corresponding to an amount of time said call was active over said public-switched telephone network and said called party is uncharged for a part of said duration of said phone call over said packet-switched network.

7. A method of switching telecommunications networks, comprising:
   receiving a phone call to a hand-held wireless device via a public-switched telephone network, said phone call having a dialed number associated with said hand-held wireless device of a called party;
   determining if, in addition to a network path via said public-switched telephone network, said hand-held wireless device of said called party has an active and authenticated data connection via a packet-switched network with a telecommunications switch;
   determining that sufficient bandwidth exists over said packet-switched network for said phone call;
   sending said phone call to said hand-held wireless device associated with said called party via said authenticated data connection;
   where an insufficient bandwidth condition arises over said packet-switched network, connecting said phone call via said public-switched telephone network; and
   after establishing said phone call between a calling party and said called party, transferring said phone call to said packet-switched network upon detection of a pre-determined DTMF key sequence being entered.

8. The method of claim 7, wherein said call is received at said telecommunications switch after having been initially received via said public-switched telephone network and forwarded from said called party.

9. The method of claim 8, wherein said call is carried out via said telecommunications switch.

10. The method of claim 7 wherein said phone call is received at said telecommunications switch after having been initially received from said wireless device and automatically forwarded to said telecommunications switch.

11. The method of claim 9 wherein said call is automatically forwarded to said telecommunications switch.

12. The method of claim 10 wherein said call is sent to said hand-held wireless device via said packet-switched network.

13. The method of claim 9 wherein said phone call was forwarded over the public-switched telephone network.

14. The method of claim 9 wherein said phone call was forwarded via said packet-switched data network.

15. The method of claim 7, charging a fee for only a portion of minutes of said phone call, wherein said portion consists of minutes during which said call continues on said public-switched telephone network and exhibiting a number of unbilled minutes to said hand-held wireless device.

16. The method of claim 7, further comprising:
   determining network conditions of said packet-switched network before said step of attempting to send said phone call via said packet-switched network; and
   at a first connecting of said call to said called party, connecting said call via said public-switched telephone network based on insufficient network conditions for said call.

17. The method of claim 7, wherein said phone call is sent via said packet-switched network; and
   during said call, said call is transferred to said public-switched telephone network upon a pre-determined threshold number of packets being dropped.

18. The method of claim 7, wherein said determined bandwidth is based on a network type reported by said hand-held wireless device.

* * * * *